(12) United States Patent
Song et al.

(10) Patent No.: US 11,250,975 B2
(45) Date of Patent: Feb. 15, 2022

(54) SUPERCONDUCTING CURRENT LIMITER HAVING COMPOSITE INSULATION STRUCTURE

(71) Applicants: GUANGDONG POWER GRID CO., LTD., Guangdong (CN); ELECTRIC POWER RESEARCH INSTITUTE OF GUANGDONG POWER GRID CO., LTD., Guangdong (CN)

(72) Inventors: Meng Song, Guangdong (CN); Lianhong Zhong, Guangdong (CN); Bing Zhao, Guangdong (CN); Li Li, Guangdong (CN); Yunsong Luo, Guangdong (CN); Yajun Xia, Guangdong (CN); Wenfeng Cheng, Guangdong (CN); Zhengjun Shi, Guangdong (CN); Shaotao Dai, Guangdong (CN); Bangzhu Wang, Guangdong (CN); Lei Hu, Guangdong (CN); Tao Ma, Guangdong (CN); Teng Zhang, Guangdong (CN)

(73) Assignees: GUANGDONG POWER GRID CO., LTD., Guangdong (CN); ELECTRIC POWER RESEARCH INSTITUTE OF GUANGDONG POWER GRID CO., LTD., Guangdong (CN)

( * ) Notice: Subject to any disclaimer, the term of this patent is extended or adjusted under 35 U.S.C. 154(b) by 0 days.

(21) Appl. No.: 16/972,493

(22) PCT Filed: Aug. 27, 2019

(86) PCT No.: PCT/CN2019/102669
§ 371 (c)(1),
(2) Date: Dec. 4, 2020

(87) PCT Pub. No.: WO2020/186692
PCT Pub. Date: Sep. 24, 2020

(65) Prior Publication Data
US 2021/0407710 A1    Dec. 30, 2021

(30) Foreign Application Priority Data
Mar. 18, 2019    (CN) .......................... 201910204689.2

(51) Int. Cl.
*H01B 17/60* (2006.01)
*H01B 17/58* (2006.01)

(52) U.S. Cl.
CPC ............. *H01B 17/58* (2013.01); *H01B 17/60* (2013.01)

(58) Field of Classification Search
CPC ........ H01B 17/58; H01B 17/60; H01B 12/00; H01B 12/02; H01B 12/06; H01B 12/14; H01B 12/16; H01R 43/00; H02G 15/30
(Continued)

(56) References Cited

U.S. PATENT DOCUMENTS 7,902,461 B2 *  3/2011  Folts .................. H01B 12/02
                                                           174/125.1
8,039,742 B2 * 10/2011  Hirose ................ F16L 59/143
                                                           174/15.5
(Continued)

FOREIGN PATENT DOCUMENTS

| CN | 108172333 A | 6/2018 |
|----|-------------|--------|
| CN | 109818342 A | 5/2019 |
| JP | 05190354 A  | 7/1993 |

OTHER PUBLICATIONS

PCT/CN2019/102669 Search Report dated Jan. 2, 2020.

*Primary Examiner* — Angel R Estrada
(74) *Attorney, Agent, or Firm* — Michael Best & Friedrich LLP

(57) ABSTRACT

Provided is a superconducting fault current limiter having a composite insulating structure. The superconducting fault
(Continued)

current limiter includes: a superconducting current limiting unit, an inner composite insulating cylinder, an outer composite insulating cylinder and a low-temperature container. The outer composite insulating cylinder is sleeved inside the low-temperature container; the inner composite insulating cylinder is sleeved inside the outer composite insulating cylinder; the superconducting current limiting unit is sleeved inside the inner composite insulating cylinder. The superconducting current limiting unit and the inner composite insulating cylinder are securely connected through a first support, and the low-temperature container and the outer composite insulating cylinder are securely connected through a second support.

9 Claims, 1 Drawing Sheet

(58) Field of Classification Search
USPC ...... 174/209, 36, 110 R, 113 R, 74 R, 125.1, 174/15.4; 505/230, 231, 704, 925, 926; 257/661, 662, 663
See application file for complete search history.

(56) References Cited

U.S. PATENT DOCUMENTS

| | | | |
|---|---|---|---|
| 8,044,298 B2 * | 10/2011 | Sexton | H01B 7/0216 174/36 |
| 8,134,072 B2 * | 3/2012 | Allais | H01B 12/16 174/125.1 |
| 8,748,747 B2 * | 6/2014 | Soika | H01B 12/02 174/125.1 |
| 8,948,831 B2 * | 2/2015 | Stemmle | H01B 12/02 505/230 |
| 9,006,576 B2 * | 4/2015 | Stemmle | H01R 43/00 174/125.1 |

* cited by examiner

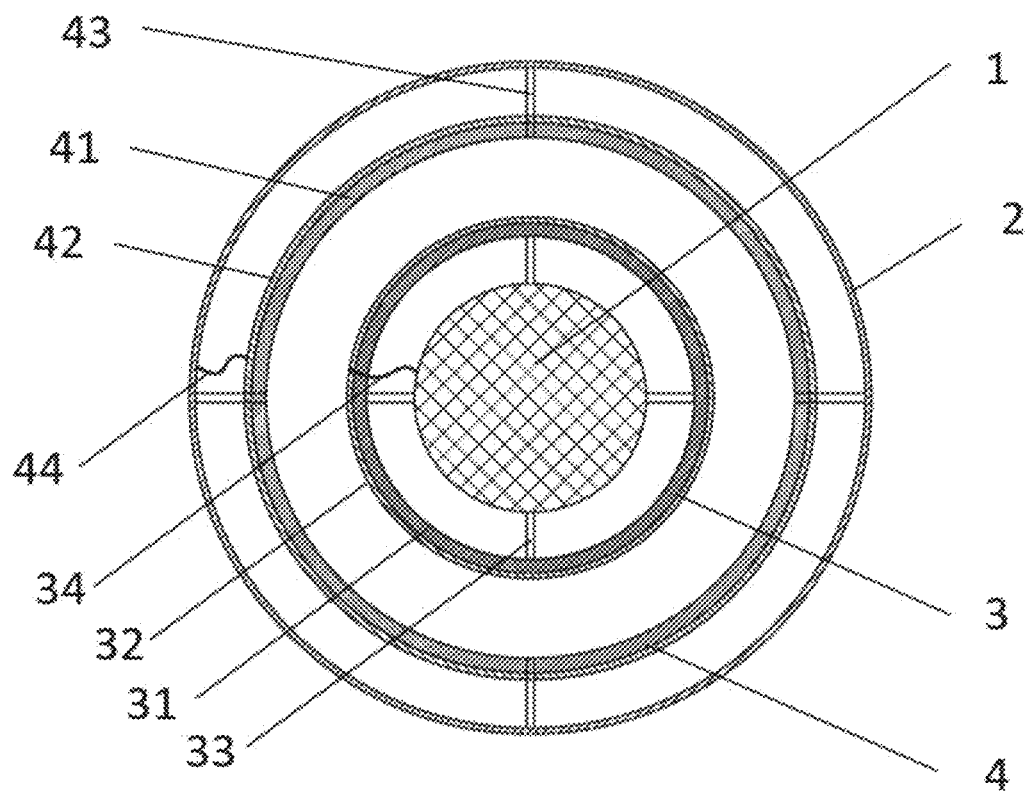

SUPERCONDUCTING CURRENT LIMITER HAVING COMPOSITE INSULATION STRUCTURE

This application is a National Stage Application, filed under 35 U.S.C. 371, of International Patent Application No. PCT/CN2019/102669, filed on Aug. 27, 2019, which claims priority to Chinese Patent Application No. CN201910204689.2, entitled "SUPERCONDUCTIVE CURRENT LIMITER WITH COMPOSITE INSULATION STRUCTURE" and filed with the CNIPA on Mar. 18, 2019, contents of both of which are incorporated herein by reference in their entireties.

TECHNICAL FIELD

The present application relates to the technical field of superconductivity, and particularly to a superconducting fault current limiter having a composite insulating structure.

BACKGROUND

A resistive type superconducting fault current limiter is a type of power device used to suppress a magnitude of a short-circuit fault current in a power grid. For a high-voltage power device, insulation of the device needs to be considered. The resistive type superconducting fault current limiter may be developed based on characteristics of transition from a superconducting state to a normal state of a superconducting tape. When normally conveying a ready-state operating current, the superconducting tape presents the superconducting state and the resistance is close to "zero"; when a short-circuit fault occurs in the power grid, the superconducting tape automatically transitions to the normal state under the action of a current, and the resistance rapidly rises up to the resistance of a conventional conductor. Such increase in resistance can increase the short-circuit impedance of the power grid, thus reducing the magnitude of the short-circuit current.

In the existing resistive type superconducting fault current limiter, Yttrium barium copper oxide (YBCO) material may be used as a conductor, and liquid nitrogen may be used as a cooling and insulating medium. Liquid nitrogen has a high dielectric strength similar to the dielectric strength of transformer oil, has a breakdown field strength up to 35 kV/mm at 77 K and at normal pressure, and has a relative dielectric constant of about 1.43. However, the problem with liquid nitrogen as the insulating medium is that liquid nitrogen at 77 K is in a boiling state, and even if the temperature is lowered to about 70 K, liquid nitrogen is almost in the boiling state, and thus tiny thermal disturbance can cause the liquid nitrogen to vaporize and generate bubbles. Nitrogen gas has a dielectric strength of only 3.0 kV/mm and a relative dielectric constant of about 1. Both the dielectric strength and the relative dielectric constant of nitrogen gas are quite different from those of liquid nitrogen. According to the electric flux theorem, the electric fluxes in adjacent same normal sections are the same, so that the electric field distribution. i.e., electric field intensity, in different insulating media is proportional to the dielectric constant of the insulating media under alternating-current conditions; the electric field intensity in different insulating media is proportional to the direct current resistance of the insulating media under direct-current conditions. Therefore, when bubbles appear in liquid nitrogen, the bubbles will become the concentration points of an electric field, and the overall dielectric strength will be determined by the bubbles. It is assumed that the distance between a high-voltage electrode and a ground electrode is 200 mm. When an alternating-current voltage of 500 kV is applied, the corresponding field strength is 2.5 kV/mm. If the electrodes are filled with liquid nitrogen, the insulation can satisfy requirements since the actual field strength (2.5 kV/mm) is far lower than the breakdown field strength (35 kV/mm) of the liquid nitrogen; if bubbles appear between the electrodes due to external thermal disturbance, it can be seen according to the electric flux theorem and the dielectric constant value that the electric field strength in the bubbles reaches 3.6 kV/mm, which already exceeds the breakdown field strength of nitrogen gas, causing breakdown in the bubbles and thus destroying the whole insulation. According to the above parameters, if full liquid nitrogen insulation is used, only about 20 mm of liquid nitrogen is needed to achieve insulation when the alternating current voltage of 500 kV is applied. Therefore, one of the means for improving the insulating effect of the resistive type superconducting fault current limiter is to prevent the generation of bubbles between the electrodes.

SUMMARY

A superconducting fault current limiter having a composite insulating structure is provided in embodiments of the present application, preventing the generation of bubbles between electrodes and ensuring the insulating effect of a resistive type superconducting fault current limiter.

A superconducting fault current limiter having a composite insulating structure is provided in an embodiment of the present application and includes a superconducting current limiting unit, an inner composite insulating cylinder, an outer composite insulating cylinder and a low-temperature container.

The outer composite insulating cylinder is sleeved inside the low-temperature container.

The inner composite insulating cylinder is sleeved inside the outer composite insulating cylinder.

The superconducting current limiting unit is sleeved inside the inner composite insulating cylinder.

The superconducting current limiting unit and the inner composite insulating cylinder are securely connected through a first support, and the low-temperature container and the outer composite insulating cylinder are securely connected through a second support.

Optionally, the inner composite insulating cylinder includes an inner equipotential bonding conductor, an inner insulating layer and an inner conductive layer from inside to outside along a radial direction; the inner equipotential bonding conductor connects the superconducting current limiting unit to the inner conductive layer; and the inner conductive layer is securely wound around an outer side of the inner insulating layer.

Optionally, the inner conductive layer is securely wound around the outer side of the inner insulating layer in a half-lapping manner.

Optionally, the inner conductive layer and the outer side of the inner insulating layer are securely connected through a low-temperature epoxy resin.

Optionally, a first end of the first support is secured to the superconducting current limiting unit through a bolt; and a second end of the first support is secured to the inner insulating layer through a non-metallic bolt.

Optionally, the number of first supports is at least two; and the at least two first supports are radially distributed in an array along a circumference.

Optionally, the outer composite insulating cylinder includes an outer insulating layer, an outer conductive layer and an outer equipotential bonding conductor from inside to outside along a radial direction; the outer conductive layer is securely wound around an outer side of the outer insulating layer; and the outer equipotential bonding conductor connects the low-temperature container to the outer conductive layer.

Optionally, the outer conductive layer and the outer side of the outer insulating layer are securely connected through a low-temperature epoxy resin.

Optionally, a first end of the second support is secured to a sidewall of the low-temperature container through a bolt; and a second end of the second support is secured to the outer insulating layer through a non-metallic bolt.

Optionally, the number of second supports is at least two; and the at least two second supports are radially distributed in an array along a circumference.

It can be seen from the above solution that the present application has the advantages described below.

A superconducting fault current limiter having a composite insulating structure is provided in the embodiments of the present application and includes a superconducting current limiting unit, an inner composite insulating cylinder, an outer composite insulating cylinder and a low-temperature container. The outer composite insulating cylinder is sleeved inside the low-temperature container. The inner composite insulating cylinder is sleeved inside the outer composite insulating cylinder. The superconducting current limiting unit is sleeved inside the inner composite insulating cylinder. The superconducting current limiting unit and the inner composite insulating cylinder are securely connected through a first support. The low-temperature container and the outer composite insulating cylinder are securely connected through a second support. According to the embodiments of the present application, the outer composite insulating cylinder connected to the low-temperature container blocks and keeps the bubbles generated by the low-temperature container between the low-temperature container and the outer composite insulating cylinder, and the inner composite insulating cylinder connected to the superconducting current limiting unit make blocks and keeps the bubbles generated by the superconducting current limiting unit between the superconducting current limiting unit and the inner composite insulating cylinder, blocking the radial diffusion path of the bubbles in the space of liquid nitrogen, reducing the impact of the bubbles on the main insulation, preventing the generation of bubbles between electrodes, and improving the insulating effect of the resistive type superconducting fault current limiter.

BRIEF DESCRIPTION OF DRAWINGS

To illustrate the solutions in the embodiments of the present disclosure or the solutions in the existing art more clearly, drawings used in the description of the embodiments or the existing art will be briefly described below. Apparently, the drawings described below illustrate only part of the embodiments of the present disclosure, and those of ordinary skill in the art may obtain other drawings based on the drawings described below without any creative work.

FIG. 1 illustrates a schematic structure diagram of a superconducting fault current limiter having a composite insulating structure according to an embodiment of the present application.

REFERENCE LIST 1 superconducting current limiting unit
2 low-temperature container
3 inner composite insulating cylinder
4 outer composite insulating cylinder
31 inner insulating layer
32 inner conductive layer
33 inner equipotential bonding conductor
34 first support
41 outer insulating layer
42 outer conductive layer
43 outer equipotential bonding conductor
44 second support

DETAILED DESCRIPTION

A superconducting fault current limiter having a composite insulating structure is provided in embodiments of the present application, preventing the generation of bubbles between electrodes and improving the insulating effect of a resistive type superconducting fault current limiter.

To make the purposes, features and advantages of the present application more apparent and easier to understand, solutions in the embodiments of the present application will be described clearly and completely in conjunction with the drawings in the embodiments of the present application. Apparently, the embodiments described below are part, not all of the embodiments of the present application. Based on the embodiments in the present application, all other embodiments obtained by those of ordinary skill in the art without creative work are within the scope of the present application.

Referring to FIG. 1, a superconducting fault current limiter having a composite insulating structure is provided in an embodiment of the present application and includes a superconducting current limiting unit 1, an inner composite insulating cylinder 3, an outer composite insulating cylinder 4 and a low-temperature container 2.

The outer composite insulating cylinder 4 is sleeved inside the low-temperature container 2.

The inner composite insulating cylinder 3 is sleeved inside the outer composite insulating cylinder 4.

The superconducting current limiting unit 1 is sleeved inside the inner composite insulating cylinder 3.

The superconducting current limiting unit 1 and the inner composite insulating cylinder 3 are securely connected through a first support 34; the low-temperature container 2 and the outer composite insulating cylinder 4 are securely connected through a second support 44.

It is to be noted that the inner composite insulating cylinder 3 and the outer composite insulating cylinder 4 each are a cylinder with both ends open, the superconducting current limiting unit 1 is wrapped inside the inner composite insulating cylinder 3, and the inner sidewall of the low-temperature container 2 covers the outer sidewall of the outer composite insulating cylinder 4.

According to the embodiments of the present application, the outer composite insulating cylinder 4 connected to the low-temperature container 2 blocks and keeps the bubbles generated by the low-temperature container 2 between the low-temperature container 2 and the outer composite insulating cylinder 4, and the inner composite insulating cylinder 3 connected to the superconducting current limiting unit 1 blocks and keeps the bubbles generated by the superconducting current limiting unit 1 between the superconducting current limiting unit 1 and the inner composite insulating cylinder 3, blocking the radial diffusion path of the bubbles in the space of liquid nitrogen, reducing the impact of the bubbles on the main insulation, preventing the generation of bubbles between electrodes, and improving the insulating effect of the resistive type superconducting fault current limiter.

Furthermore, the inner composite insulating cylinder 3 includes an inner equipotential bonding conductor 33, an inner insulating layer 31 and an inner conductive layer 32 from inside to outside along a radial direction; the inner equipotential bonding conductor 33 connects the superconducting current limiting unit 1 to the inner conductive layer 32; the inner conductive layer 32 is securely wound around an outer side of the inner insulating layer 31.

It is to be noted that the inner insulating layer 31 may be made of an epoxy resin and glass fiber composite material having a high strength at low temperature, and for a large structural member, may be formed by winding and curing glass fibers and a low-temperature epoxy resin on a mold.

The inner insulating layer 31 needs to match the superconducting current limiting unit 1 in dimension. If the diameter and the length of the superconducting current limiting unit 1 are $D_{sfcl}$ and $L_{sfcl}$ respectively, the diameter and the length of the inner insulating layer 31 are generally ($D_{sfcl}$+0.2 m) and ($L_{sfcl}$+0.4 m) respectively.

To improve the bubble blocking performance of the inner composite insulating cylinder 3, the sidewall of the inner insulating layer 31 must not have holes.

The inner conductive layer 32 is made of a semi-conductive material and includes, but is not limited to, semi-conductive carbon paper, a semi-conductive nylon tape, or a semi-conductive non-woven tape.

The inner conductive layer 32 is wound around the outer side of the inner insulating layer 31, and it merely needs to satisfy that the outer side of the inner insulating layer 31 is continuously covered by the inner conductive layer 32.

The inner equipotential bonding conductor 33 is a metal conductor for connecting the superconducting current limiting unit 1 to the inner conductive layer 32 to ensure an equipotential between the superconducting current limiting unit 1 and the inner conductive layer 32.

The inner equipotential bonding conductor 33 is merely used for potential bonding and does not need to carry currents, and may be made of a copper or aluminum braid of 10 to 30 mm². The inner equipotential bonding conductor 33 has one end connected to the superconducting current limiting unit 1 and the other end connected to the inner conductive layer 32.

Furthermore, the inner conductive layer 32 is securely wound around the outer side of the inner insulating layer 31 in a half-lapping manner.

Furthermore, the inner conductive layer 32 and the outer side of the inner insulating layer 31 are securely connected through a low-temperature epoxy resin.

It is to be noted that to improve reliability of the connection at low temperature, a low-temperature epoxy resin may be brushed between the inner conductive layer 32 and the inner insulating layer 31 for securing. Furthermore, a first end of the first support 34 is secured to the superconducting current limiting unit 1 through a bolt; and a second end of the first support 34 is secured to the inner insulating layer 31 through a non-metallic bolt.

It is to be noted that the first support 34 is a non-metallic insulating support having a certain strength at low temperature, is used for securing the inner insulating layer 31 to the superconducting current limiting unit 1, and may be made of fiberglass.

The first end of the first support 34 is secured to the skeleton of the superconducting current limiting unit 1 through a bolt, and the second end of the first support 34 is secured to the inner insulating layer 31 through a non-metallic bolt, whereby the relative position between the inner insulating layer 31 and the superconducting current limiting unit 1 can be fixed.

Furthermore, the number of first supports 34 is at least two.

The at least two first supports 34 are radially distributed in an array along a circumference.

It is to be noted that in the embodiment, four first supports 34 are provided and radially distributed in an array along a circumference. The actual number can be determined after the strength of the whole structure is checked.

Furthermore, the outer composite insulating cylinder 4 includes an outer insulating layer 41, an outer conductive layer 42 and an outer equipotential bonding conductor 43 from inside to outside along a radial direction; the outer conductive layer 42 is securely wound around an outer side of the outer insulating layer 41; and the outer equipotential bonding conductor 43 connects the low-temperature container 2 to the outer conductive layer 42.

It is to be noted that the outer insulating layer 41 may be made of an epoxy resin and glass fiber composite material having a high strength at low temperature, and for a large structural member, the outer insulating layer 41 may be formed by winding and curing glass fibers and a low-temperature epoxy resin on a mold.

The outer insulating layer 41 needs to match the low-temperature container 2 of the superconducting fault current limiter in dimension. If the inner diameter of the low-temperature container 2 is $D_c$ and the length of the superconducting current limiting unit 1 is $L_{sfcl}$, the diameter of the outer insulating layer 41 is generally ($D_c$−0.2 m) and the length of the outer insulating layer 41 is generally ($L_{sfcl}$+1.0 m).

To improve the bubble blocking performance of the outer composite insulating cylinder 4, the sidewall of the outer insulating layer 41 must not have holes.

The outer conductive layer 42 is made of a semi-conductive material and includes, but is not limited to, semi-conductive carbon paper, a semi-conductive nylon tape, or a semi-conductive non-woven tape.

The outer conductive layer 42 is wound around the outer side of the inner insulating layer 41, and it merely needs to satisfy that the outer side of the outer insulating layer 41 is continuously covered by the outer conductive layer 42.

The outer equipotential bonding conductor 43 is a metal conductor for connecting the low-temperature container 2 to the outer conductive layer 42 to ensure an equipotential between the low-temperature container 2 and the outer conductive layer 42.

The outer equipotential bonding conductor 43 is merely used for potential bonding and does not need to carry currents, and may be made of a copper or aluminum braid of 10 to 30 mm². The outer equipotential bonding conductor 43 has one end connected to the low-temperature container 2 and the other end connected to the outer conductive layer 42.

Furthermore, the outer conductive layer 42 and the outer side of the outer insulating layer 41 are securely connected through a low-temperature epoxy resin.

It is to be noted that to improve reliability of the connection at low temperature, a low-temperature epoxy resin material may be brushed between the semi-conductive material and the outer insulating layer 41 for securing.

Further, a first end of the second support 44 is secured to a sidewall of the low-temperature container 2 through a bolt;

and a second end of the second support 44 is secured to the outer insulating layer 41 through a non-metallic bolt.

It is to be noted that the second support 44 is a non-metallic insulating support having a certain strength at low temperature, is used for securing the outer insulating layer 41 to the low-temperature container 2, and may be made of fiberglass.

The first end of the second support 44 is secured to the sidewall of the low-temperature container 2 through the bolt, and the second end of the second support 44 is secured to the outer insulating layer 41 through the non-metallic bolt, whereby the relative position between the outer insulating layer 41 and the low-temperature container 2 can be fixed.

Furthermore, the number of second supports 44 is at least two.

The at least two second supports 44 are radially distributed in an array along a circumference.

It is to be noted that in the embodiment, four second supports 44 are provided and radially distributed in an array along a circumference. The actual number can be determined after the strength of the whole structure is checked.

In the embodiment, the superconducting current limiting unit 1 is a 160 kV direct-current component. The diameter $D_{sfcl}$ and the length $L_{sfcl}$ of the superconducting current limiting unit 1 are 1.0 m and 3.0 m respectively, so the inner insulating layer 31 has a diameter of 1.2 m and a length of 3.4 m. The inner insulating layer 31 is made of a G10 high-density epoxy resin composite material having a high strength at low temperature. The inner conductive layer 32 is wound with 30 mm wide carbon paper in a half-lapping manner with a thickness of 0.2 mm. The inner equipotential bonding conductor 33 is made of a copper braid of 16 mm$^2$, and have two ends secured to the equipotential shielding ring of the superconducting current limiting unit 1 and the inner conductive layer 32 through a copper nose and the bolt, respectively. The first supports 34 are eight non-metallic rods made of G10 materials, which are equally divided into two groups respectively on two sides of the superconducting current limiting unit 1 for securing the inner insulating layer 31, and are evenly distributed along the circumferential direction of an end during securing. That is, one is placed every 90 degrees, and is secured by a non-metallic bolt.

The low-temperature container 2 is a vacuum insulated thermostat made of stainless steel. The inner diameter $D_c$ of the low-temperature container 2 is 1.6 m and the length $L_{sfcl}$ of the superconducting current limiting unit 1 is 3.0 m, so the outer insulating layer 41 has a diameter of 1.4 m and a length of 4.0 m. The outer insulating layer 41 is made of a G10 high-density epoxy resin composite material having a high strength at low temperature. The outer conductive layer 42 is wound with 30 mm wide carbon paper in a half lapping manner with a thickness of 0.2 mm. The outer equipotential bonding conductor 43 is made of a copper braid of 16 mm$^2$, and have two ends secured to the sidewall of the low-temperature container 2 and the outer conductive layer 42 through a copper nose and the bolt, respectively. The second supports 44 are eight non-metallic rods made of G10 materials, are equally divided into two groups respectively on two sides of the outer insulating layer 41 for securing the outer insulating layer 41 to the low-temperature container 2, and are evenly distributed along the circumferential direction of an end during securing. That is, one is placed every 90 degrees, and is secured by a non-metallic bolt.

With the above structure adopted and according to the withstand voltage requirement of 160 kV direct-current equipment of up to 300 kV, an electrode pair is formed of the inner conductive layer 32 and the outer conductive layer 42, and it can be seen from the above dimensions that an electrode spacing is 100 mm. The electric field strength is 3.0 kV/mm according to an electric field calculation formula. Since the medium between the electrodes is complete liquid nitrogen, no nitrogen bubbles will be generated, thus satisfying the insulation requirements.

As described above, the preceding embodiments are only used to explain the solutions of the present application and not to be construed as limitations thereto; though the present application has been described in detail with reference to the preceding embodiments, those of ordinary skill in the art should understand that modifications can be made on the solutions in the preceding embodiments or equivalent substitutions can be made on part of the features therein; and such modifications or substitutions do not make the corresponding solutions depart from the spirit and scope of the solutions in the embodiments of the present application.

What is claimed is:

1. A superconducting fault current limiter having a composite insulating structure, comprising:
   a superconducting current limiting unit, an inner composite insulating cylinder, an outer composite insulating cylinder and a low-temperature container;
   wherein the outer composite insulating cylinder is sleeved inside the low-temperature container;
   the inner composite insulating cylinder is sleeved inside the outer composite insulating cylinder;
   the superconducting current limiting unit is sleeved inside the inner composite insulating cylinder;
   wherein the superconducting current limiting unit and the inner composite insulating cylinder are securely connected through a first support, and the low-temperature container and the outer composite insulating cylinder are securely connected through a second support; and wherein
   the inner composite insulating cylinder comprises an inner equipotential bonding conductor, an inner insulating layer and an inner conductive layer from inside to outside along a radial direction; the inner equipotential bonding conductor connects the superconducting current limiting unit to the inner conductive layer; and
   the inner conductive layer is securely wound around an outer side of the inner insulating layer.

2. The superconducting fault current limiter having a composite insulating structure of claim 1, wherein the inner conductive layer is securely wound around the outer side of the inner insulating layer in a half-lapping manner.

3. The superconducting fault current limiter having a composite insulating structure of claim 1, wherein the inner conductive layer and the outer side of the inner insulating layer are securely connected through a low-temperature epoxy resin.

4. The superconducting fault current limiter having a composite insulating structure of claim 1, wherein a first end of the first support is secured to the superconducting current limiting unit through a bolt; and
   a second end of the first support is secured to the inner insulating layer through a non-metallic bolt.

5. The superconducting fault current limiter having a composite insulating structure of claim 1, wherein a number of first supports is at least two; and
   the at least two first supports are radially distributed in an array along a circumference.

6. The superconducting fault current limiter having a composite insulating structure of claim 1, wherein the outer composite insulating cylinder comprises an outer insulating layer, an outer conductive layer and an outer equipotential bonding conductor from inside to outside along a radial direction;

the outer conductive layer is securely wound around an outer side of the outer insulating layer; and the outer equipotential bonding conductor connects the low-temperature container to the outer conductive layer.

7. The superconducting fault current limiter having a composite insulating structure of claim 6, wherein the outer conductive layer and the outer side of the outer insulating layer are securely connected through a low-temperature epoxy resin.

8. The superconducting fault current limiter having a composite insulating structure of claim 6, wherein a first end of the second support is secured to a sidewall of the low-temperature container through a bolt; and a second end of the second support is secured to the outer insulating layer through a non-metallic bolt.

9. The superconducting fault current limiter having a composite insulating structure of claim 6, wherein a number of second supports is at least two; and the at least two second supports are radially distributed in an array along a circumference.

\* \* \* \* \*